(12) United States Patent
Mak

(10) Patent No.: US 7,674,444 B2
(45) Date of Patent: Mar. 9, 2010

(54) CONFIGURATIONS AND METHODS FOR REMOVAL OF MERCAPTANS FROM FEED GASES

(75) Inventor: John Mak, Santa Ana, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 0 days.

(21) Appl. No.: 12/160,652

(22) PCT Filed: Jan. 23, 2007

(86) PCT No.: PCT/US2007/002097

§ 371 (c)(1),
(2), (4) Date: Dec. 15, 2008

(87) PCT Pub. No.: WO2007/089547

PCT Pub. Date: Aug. 9, 2007

(65) Prior Publication Data
US 2009/0087368 A1 Apr. 2, 2009

Related U.S. Application Data

(60) Provisional application No. 60/764,513, filed on Feb. 1, 2006.

(51) Int. Cl.
  B01D 53/48 (2006.01)
  B01J 19/00 (2006.01)
  C07C 319/24 (2006.01)
  C10L 3/08 (2006.01)
(52) U.S. Cl. .............. 423/242.1; 423/244.09; 423/511; 423/562; 48/127.7; 48/197 R; 422/168; 422/169; 422/170; 422/171; 422/177; 422/180; 422/187; 422/188; 422/189; 422/190; 568/21; 568/26

(58) Field of Classification Search .............. 48/127.7, 48/197 R; 95/237; 423/242.1, 244.09, 511, 423/562; 422/168–171, 177, 180, 187–190; 568/21, 26
See application file for complete search history.

(56) References Cited

U.S. PATENT DOCUMENTS

| | | | |
|---|---|---|---|
| 3,244,618 A | | 4/1966 | Diamond et al. |
| 3,586,723 A | * | 6/1971 | Alley .............. 568/26 |
| 3,989,811 A | | 11/1976 | Hill |
| 4,362,614 A | * | 12/1982 | Asdigian .......... 208/235 |
| 4,412,912 A | * | 11/1983 | Asdigian .......... 208/206 |
| 4,626,341 A | * | 12/1986 | Verachtert ........ 208/235 |
| 4,808,765 A | | 2/1989 | Pearce et al. |
| 4,875,997 A | * | 10/1989 | Langford .......... 208/235 |
| 4,980,046 A | | 12/1990 | Zarchy et al. |
| 5,202,494 A | * | 4/1993 | Roberts et al. ...... 568/26 |
| 6,096,280 A | | 8/2000 | Ellenor et al. |
| 6,294,699 B1 | * | 9/2001 | Refvik et al. ...... 568/26 |
| 6,306,288 B1 | * | 10/2001 | Pittman et al. ..... 208/235 |

(Continued)

Primary Examiner—Timothy C Vanoy
(74) Attorney, Agent, or Firm—Fish & Associates, PC

(57) ABSTRACT

A sulfur species-containing feed gas is processed in a treatment plant in which COS is hydrolyzed, and in which so produced hydrogen sulfide and other sulfur species are absorbed in a lean hydrocarbon liquid. The sulfur species in the so formed rich hydrocarbon liquid are then subjected to catalytic conversion into disulfides, which are subsequently removed from the rich solvent. Most preferably, sulfur free lean solvent is regenerated in a distillation column and/or refinery unit, and light components are recycled from the rich hydrocarbon liquid to the absorber.

20 Claims, 2 Drawing Sheets

U.S. PATENT DOCUMENTS 6,666,908 B2 12/2003 Cadours et al.
6,686,506 B1 * 2/2004 Hesse et al. .................. 568/26

2006/0051275 A1 3/2006 Ramani et al.

* cited by examiner

Prior Art Figure 1

CONFIGURATIONS AND METHODS FOR REMOVAL OF MERCAPTANS FROM FEED GASES

This application claims priority to our U.S. provisional patent application with the Ser. No. 60/764,513, which was filed Feb. 1, 2006.

FIELD OF THE INVENTION

The field of the invention is gas processing and treating, and especially gas processing and treating to remove sulfur-containing compounds from natural gas and refinery fuel gas.

BACKGROUND OF THE INVENTION

Gas streams can be treated in numerous manners to reduce acid gas content (e.g., $H_2S$ and/or $CO_2$), typically using a solvent with more or less pronounced selectivity towards a specific acid gas component. Unfortunately, many gas streams also contain considerable quantities of non-acid gas contaminants, and particularly mercaptans and other sulfurous species (e.g. lower alkyl mercaptans, carbonyl sulfide, dimethyl disulfide, carbon disulfide, propanethiol, thiophene, etc.), which tend to participate in undesirable side reactions with the solvent. As a consequence of such reactions, solvent processing, replacement and/or additives to reduce corrosion and inhibitor formation are often required. Alternatively, in other known configurations, pre- and post treatment units are needed to render the gas stream suitable for further processing.

One exemplary known gas treatment configuration that employs a physical solvent is depicted in Prior Art FIG. 1 in which the acid gases are absorbed in an absorber that forms a rich solvent. The rich solvent is then flashed in a flash drum with the vapors being recycled to the absorber while the liquid is routed to the regenerator. Here, the acid gases are removed from the solvent to form the lean solvent that is cross exchanged with the rich solvent before re-entering the absorber. The so removed acid gases and other sulfurous compounds are then processed in a three-phase separator to form a reflux for the regenerator, a contaminant vapor, and a contaminant liquid. Contaminant gases are typically further processed in a Claus plant, while contaminant liquids are usually fed to a refinery for subsequent treatment (e.g., in a hydrotreater). Most commonly, solvents are selected physical solvents or amine solvents (e.g. propylene carbonate, tributyl phosphate, methylpyrolidone, polyethylene glycol dialkyl ethers, formulated tertiary amines, etc.) that can be used to remove at least some of the mercaptans and heavy hydrocarbons from the feed gas.

While such processes generally satisfy sulfur removal requirements for various feed gases, several problems nevertheless remain. Most significantly, processing requirements for the sulfurous species to avoid acid gas emission are typically only shifted to a downstream location. For example, hydrotreating of the mercaptans laden liquids in an existing refinery unit may over-burden the process equipment, and will most often require modification of such equipment. Also, the non-$H_2S$ sulfur-containing compounds in the gases to the sulfur plant will often create conversion problems in the sulfur plant. Among other things, for high rates of thermal destruction of mercaptans and the organic sulfurs contaminants, the Claus reaction furnace needs to operate at a high flame temperature, which will significantly reduce the life of the sulfur plant and increase the capital and operating cost. However, even with higher flame temperatures, thermal destruction of mercaptans is often incomplete.

It should also be recognized that such plants are typically not selective in the removal of $H_2S$ and contaminants. Thus, co-absorption of $CO_2$ by the solvent is often relatively high, which in turn necessitates higher solvent circulation and higher energy consumption. Worse yet, co-absorption also leads to an acid gas rich in $CO_2$, which is undesirable for downstream sulfur plants. Thus, and especially where the feed gas comprises relatively large quantities of mercaptans and other organic sulfurs, capital and operating costs are significantly increased. Additionally, other contaminants (e.g. unsaturated hydrocarbons, oxygen, and sulfur dioxide) may react with the solvent leading to degradation products and reduced solvent performance.

To circumvent at least some of the problems associated with inadequate contaminant removal, various pre- and post treatment methods have been employed. Unfortunately, most of such methods tend to be relatively inefficient and costly, and where contaminants are removed by a fixed bed absorbent process, they may further pose a disposal problem for the spent absorbent. Therefore, various problems associated with operating efficiency, effluents, emissions, and product qualities, particularly in the downstream sulfur plant and tail gas unit, still remain. For example, acid gas produced from such treating processes is generally poor in quality (e.g., comprising significant quantity of contaminants, and/or a relatively large quantity of co-absorbed $CO_2$ and hydrocarbons), which often requires additional processing and higher energy consumption. Furthermore, co-absorbed hydrocarbons in the acid gas must usually be converted to $CO_2$ in the sulfur plant, which results in an increase in $CO_2$ emissions from the process. Thus, despite the significant potential energy value in the hydrocarbons, most of the currently known processes fail to recover these waste hydrocarbon streams as a valuable product.

In still other known processes, a tail gas unit is used to control the sulfur emissions from the sulfur plant. Even if the emission is reduced to a very low ppm level, total quantity of annual sulfur emissions (tons/year) in the vent stream is still relatively high, mostly due to relatively large venting rates, attributed to the large co-absorbed $CO_2$ in the treating process. Moreover, the contaminants and hydrocarbons in the acid gas of most known gas treatment configurations are often not completely destroyed in the sulfur plants, and the sulfur product will therefore be contaminated with unconverted hydrocarbons and mercaptans.

Therefore, while various gas processing treatments and configurations are known in the art, all or almost all of them suffer from one or more disadvantages, and especially where the feed gas comprises relatively high levels of acid gases, hydrocarbons, mercaptans, and organic sulfurs contaminants.

SUMMARY OF THE INVENTION

The present invention is directed to plant configurations and methods of removal of sulfurous compounds from feed gases (and optionally liquefied petroleum gas, LPG) in which COS components are hydrolyzed to form H2S, which is subsequently absorbed together with other sulfurous species in a lean hydrocarbon solvent to thereby produce a desulfurized gas and a rich solvent. Most preferably, the H2S and other sulfurous species are then oxidized in a catalytic converter to form disulfides that are removed from the solvent, which is optionally further processed to form the lean hydrocarbon solvent for re-use.

In one aspect of the inventive subject matter, a gas treatment plant includes a COS hydrolysis unit configured to hydrolyze COS in a mercaptan-containing feed gas (typically light mercaptans such as methyl and ethyl mercaptans) to form a treated feed gas. An absorber is fluidly coupled to the COS hydrolysis unit and configured to receive and contact the treated feed gas with a lean, preferably hydrotreated sulfur free hydrocarbon fluid to thereby produce a mercaptans enriched hydrocarbon fluid and a desulfurized product gas, and a catalytic conversion unit is fluidly coupled to the absorber and configured to receive the enriched fluid and to thereby produce disulfides from the mercaptans.

It is further generally preferred that a first distillation column is coupled between the absorber and the catalytic conversion unit and configured such that the first distillation column produces a first sulfur-depleted overhead product and a C2-depleted mercaptans and sulfur enriched hydrocarbon fluid. Most preferably, a first recycle conduit in such configurations is configured to feed the first sulfur-depleted overhead product to the treated feed gas. Additionally, or optionally, a second distillation column is downstream and fluidly coupled to the catalytic conversion unit, and configured such that the second distillation column produces a second sulfur-depleted overhead product and a C6+ and mercaptans-enriched hydrocarbon fluid. In such configurations, a second conduit may be provided and configured to feed the second sulfur-depleted overhead product to the desulfurized product gas.

Where desired, a hydrocarbon refining hydrotreating unit may be configured to receive and process the C6+ and mercaptans-enriched hydrocarbon fluid to thereby produce the lean hydrotreated hydrocarbon fluid that is then re-used in the absorber. Furthermore, an LPG source may be fluidly coupled to the catalytic conversion unit and provide LPG that is contaminated with one or more mercaptans and organic sulfur species. Most typically, a fuel gas source is fluidly coupled to the COS hydrolysis unit and configured to provide the COS/mercaptan-free treated gas.

Therefore, in another aspect of the inventive subject matter, a method of removing sulfur compounds from a feed gas will include a step of hydrolyzing COS in a mercaptan-containing feed gas to form a treated feed gas. In another step, the sulfur species are absorbed from the treated feed gas using a lean hydrotreated hydrocarbon fluid to thus produce a sulfur and mercaptans hydrocarbon enriched fluid and a desulfurized product gas. In yet another step the light sulfur and mercaptans species are catalytically converted in the mercaptans-enriched hydrocarbon fluid to thereby form disulfides.

Various objects, features, aspects and advantages of the present invention will become more apparent from the following detailed description of preferred embodiments of the invention.

BRIEF DESCRIPTION OF THE DRAWINGS

Prior Art

DETAILED DESCRIPTION

The present invention is directed to plant configurations and methods for treatment of a gas stream (e.g., refinery gas, fuel gas) comprising COS, acid gases, olefins, oxygen, heavy hydrocarbons, mercaptans (e.g., methyl, ethyl, propyl, butyl and heavier mercaptans), and/or organic sulfur contaminants, wherein the contaminants are first subjected to a COS hydrolysis stage, and wherein the so treated contaminants are then absorbed in an absorber that employs a solvent in which the H2S and the mercaptans are preferentially absorbed over light hydrocarbons (C1 to C4, inclusive). Light hydrocarbons carried over from the absorption step are removed from the solvent in a first distillation column and preferably fed back to the absorber. The rich solvent now containing the heavier hydrocarbons (C5+), H2S, and mercaptans is then subjected to an oxidative step to produce a disulfide-containing waste product, and remaining solvent with heavier components, which can then be processed in another column to produce desulfurized lighter components and a solvent/heavier hydrocarbon product (that may be refined to regenerate the hydrotreated hydrocarbon solvent for recycling and to produce a hydrotreated hydrocarbon sales product). It should therefore be especially appreciated that contemplated configurations and methods significantly reduce, if not even almost completely eliminate emissions of sulfurous components, hydrocarbons, and/or other contaminants while providing a sulfur and contaminant-depleted gas that meets stringent environmental standards.

Figure 1:
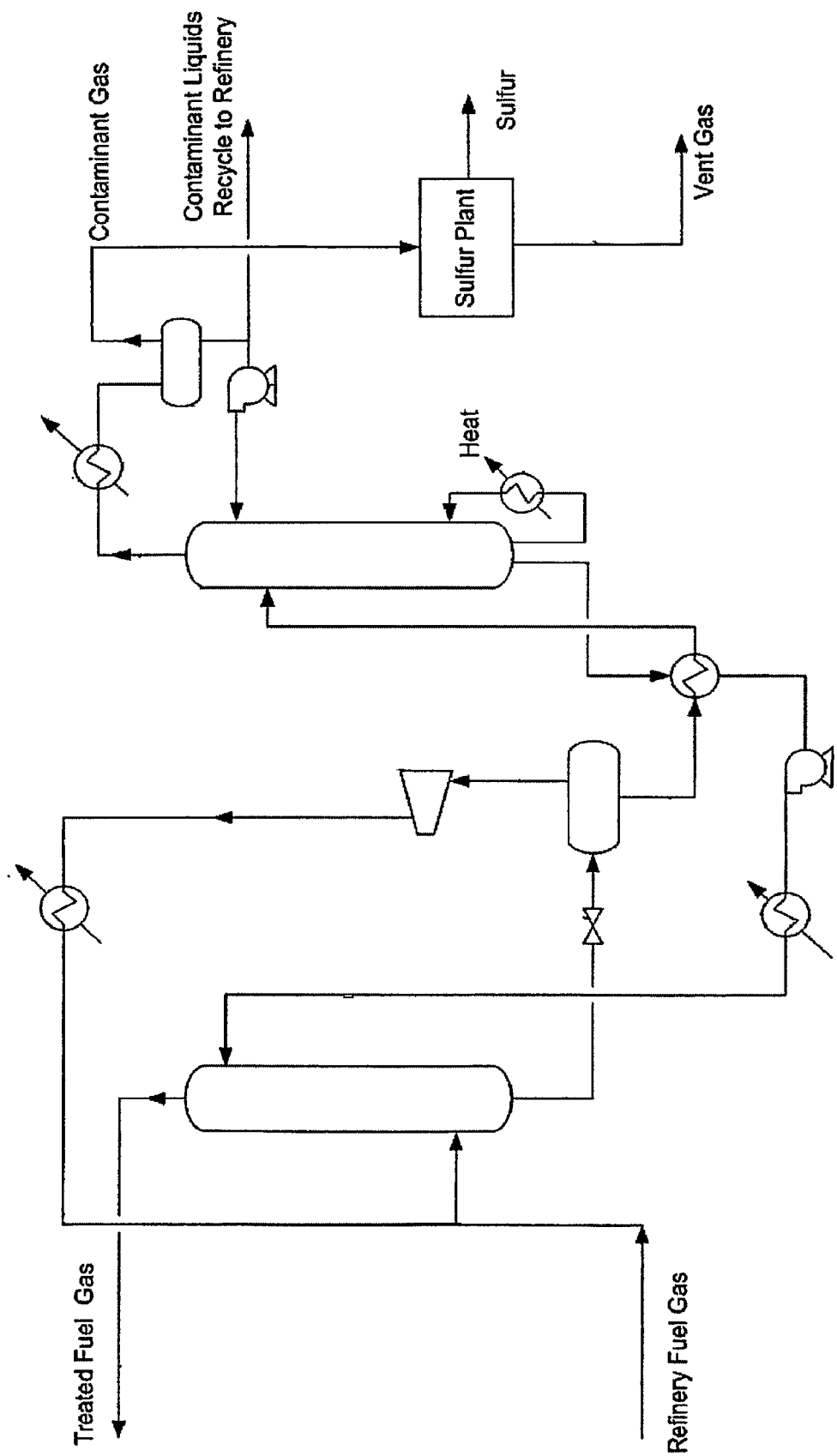
FIG. 1 is an exemplary schematic of a known gas treatment plant.
Figure 2:
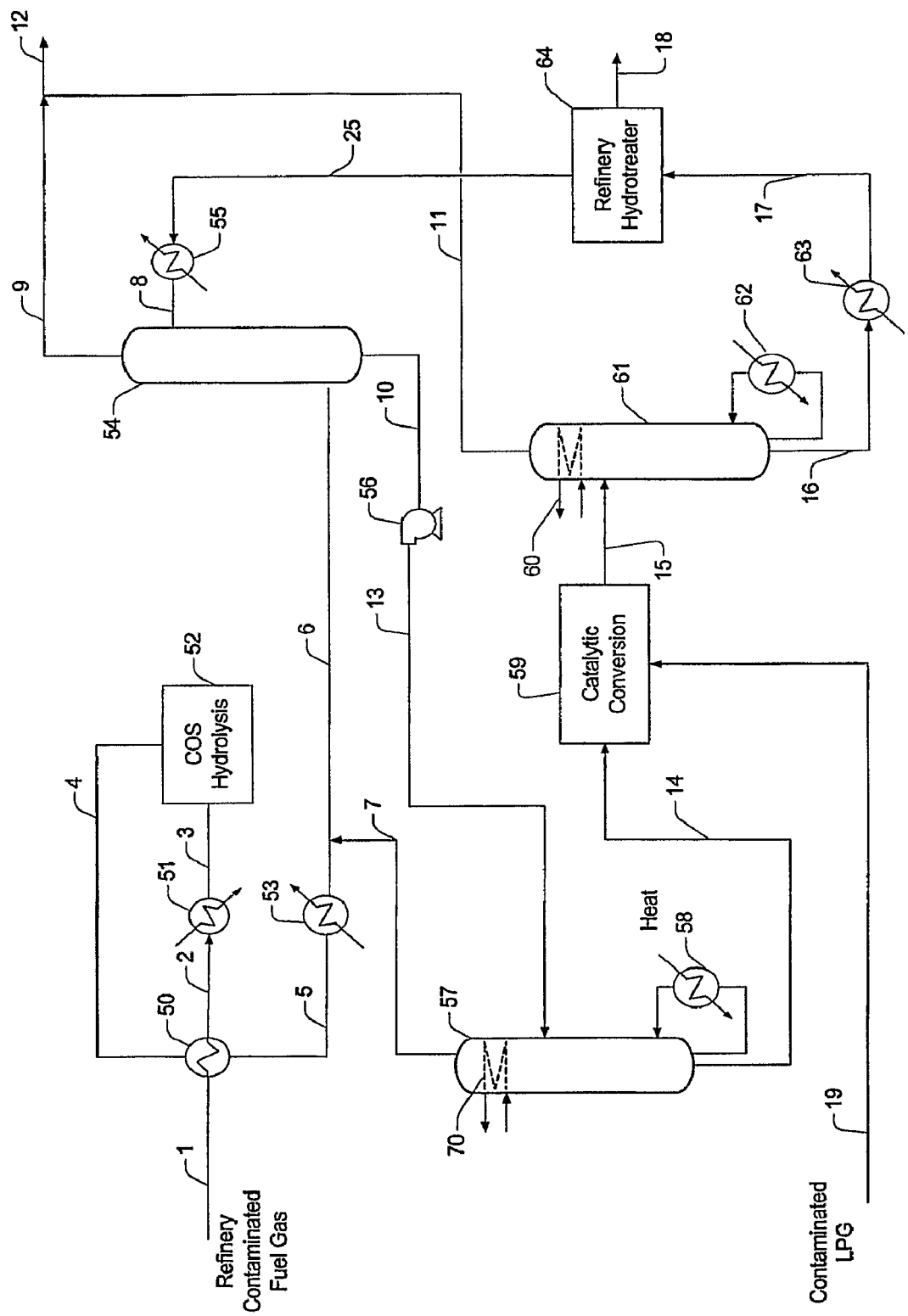
FIG. 2 is an exemplary schematic of a gas treatment plant according to the inventive subject matter.

One exemplary configuration according to the inventive subject matter is depicted in FIG. 2. Here, contaminated refinery feed gas stream 1, at about 100° F. and about 100 psig to about 200 psig, is heated in exchanger 50 to about 200° F. to about 350° F. forming stream 2, typically using the waste heat from the COS hydrolysis effluent stream 4. Stream 2 is further heating with steam or hot oil to about 350° F. in exchanger 51 forming stream 3 which is fed to the COS hydrolysis unit 52, where the COS in the feed gas is converted to $H_2S$ via hydrolysis reaction $COS+H_2O \rightarrow H_2S+CO_2$. The hydrolysis reaction is an exothermic reaction, and in the presence of a low level of $H_2S$ in stream 3, at least over about 95% of the COS content is converted to H2S. The so COS depleted gas (stream 4) is heat exchanged with the feed gas to about 150° F., forming stream 5 and is further cooled in exchanger 53 to about 90° F. (e.g., with air cooler or cooling water). The cooler effluent stream is combined with the overhead vapor stream 7 from distillation column 57, forming combined stream 6, which is fed to a lower section of the absorber 54.

Stream 6 is contacted in absorber 54 by stream 8, which is preferably a sulfur depleted hydrocarbon liquid, typically from the refinery hydrotreater unit (e.g. naphtha characterized by API Gravity ranging from 45 to 95, and RVP of 2 to 11.0 psia) to selectively absorb the mercaptans and organic sulfur contaminants. To further enhance the absorption efficiency, the hydrocarbon oil stream 25 is preferably chilled in exchanger 55 forming stream 8 at about 50° F. to about 60° F. Most typically, a refrigeration unit (e.g., using propane, or an absorption refrigeration unit) is used to supply the required chilling duty. It should be appreciated that lower temperatures will reduce the hydrocarbon oil consumption and also reduce the downstream fractionation duties. The lower chilling temperature is typically limited to the hydrate temperature of the gas in the absorber. For this reason, the chilled temperature is maintained at about 50° F. to about 60° F., or at above the hydrate temperature of the gas in the absorber 54. Alternatively, and especially where lower temperatures are desired, water may be removed at a position upstream of the absorber.

The absorber 54 produces a bottom liquid stream 10, now enriched in mercaptans and organic sulfurs that is pumped by pump 56 as stream 13 to distillation column 57 operating at about 250 psig. Distillation column 57 is preferably configured and operated to produce a bottom liquid with a low ethane concentration by use of a reboiler 58 at a temperature of about 350° F. to about 425° F. (e.g., using steam or hot oil as heat source). A cooling coil 70 is preferably integrated in the column overhead to provide reflux for rectifying the heavier components. However, it should be noted that the cooling coil can also be installed external to the column complete with reflux drum and pumps (not shown), and can also be chilled with refrigeration. Thus, the distillation column 57 produces an overhead vapor stream 7 that is depleted in mercaptans and organic sulfur, and that is recycled back to the front section of the plant. It should be especially appreciated that by controlling the operational parameters of the column 57 (temperature and pressure), the contaminant depleted lighter vapor component can be recycled back to the absorber without gas compression, while producing a contaminant enriched bottom liquid stream 14.

Stream 14 is processed in a catalytic conversion unit 59, which catalyzes oxidation of light mercaptans to disulfides in the presence of oxygen and caustic (e.g., NaOH, or other base as suitable). In most known configurations, catalytic oxidation of mercaptans to disulfides is typically used to treat light mercaptans contaminated hydrocarbon feeds (e.g., heavy straight-run gasolines, visbroken and coker derived naphthas, kerosenes, and diesels), and depending on particular configurations and feeds, pre- and post treatment sections may be necessary. The so formed disulfides are separated in the catalytic unit and sequestered as appropriate. The catalytic conversion unit 59 (sweetening unit) may also be used to process a contaminated LPG stream 19 (where available or desirable) for the production of a sulfur free hydrocarbon liquid that is further processed in downstream distillation column 61.

Distillation column 61 is typically configured to fractionate the hydrocarbon stream 15 into a contaminant free overhead vapor stream 11 and a contaminant enriched C6+ liquid stream 16, using reboiler 62 and integrated cooling condenser 60. As above, the cooling coil can be installed external to the column complete with reflux drum and pumps (not shown), and can also be chilled with refrigeration. The contaminant free overhead vapor stream 11 (which contains the C6 and lighter components) is combined with the treated gas stream 9 from absorber 54 forming stream 12. The combined treated gas typically has less than 20 ppmv sulfur content. The bottom liquid product 16 containing the C6+ and heavy sulfur and mercaptans components (that is not converted by the catalytic conversion unit 59) is cooled in cooler 63 and routed as stream 17 to refinery unit 64 (e.g. hydrotreater) for further production of a sulfur contaminant free (less than 1 ppm by wt) C6+ hydrocarbon liquid stream 18. Optionally, a portion of stream 18 is recycled back to absorber 54 as stream 25, for rectification of the sulfur contaminants. Table 1 below provides exemplary calculated feed gas and product compositions using a configuration according to FIG. 2.

TABLE 1

| | Refinery Gas | Sour LPG | Naphtha | C6+ Product | Treated Gas |
|---|---|---|---|---|---|
| | | | Stream No. | | |
| | 1 | 19 | 8 | 18 | 12 |
| Hydrogen | 0.111032 | 0.000020 | — | — | 0.078785 |
| Nitrogen | 0.000163 | 0.037378 | — | 0.000000 | 0.011724 |
| O2 | 0.085174 | 0.226166 | — | 0.000000 | 0.130676 |
| CO2 | 0.007465 | 0.000374 | — | 0.000000 | 0.005413 |
| CO2 | 0.001059 | — | — | 0.000000 | 0.000751 |
| C1 | 0.524923 | 0.009095 | — | 0.000000 | 0.375265 |
| C2 | 0.203990 | 0.022187 | — | 0.000000 | 0.151624 |
| C3 | 0.010486 | 0.156507 | — | 0.000000 | 0.055925 |
| iC4 | 0.006083 | 0.512797 | — | 0.000643 | 0.159480 |
| NC4 | 0.007358 | 0.031281 | — | 0.214714 | 0.006126 |
| iC5 | 0.000076 | 0.000001 | — | 0.461286 | 0.000003 |
| nC5 | 0.004575 | — | — | 0.000000 | 0.003246 |
| C6+ | 0.040000 | 0.000000 | — | 0.323357 | 0.021000 |
| H2S | 0.000007 | 0.004000 | — | — | 0.000005 |
| COS | 0.000221 | 0.000004 | — | — | 0.000007 |
| M-Mercaptan | 0.000220 | 0.000114 | — | — | 0.000000 |
| E-Mercaptan | 0.000271 | 0.000077 | — | — | 0.000000 |
| Thiophenes | 0.000546 | 0.000002 | — | — | 0.000000 |
| lb/hr | 34,104 | 33,971 | 83,092 | 2,051 | 65,856 |
| BPD | 6,334 | 4,133 | 7,762 | 266 | 10,188 |

With respect to the feed gas it is contemplated that the feed gas composition may vary considerably, and that suitable feed gases include natural gas at various pressures, synthesis gas, landfill waste gases, and various refinery off-gases. However, in especially preferred aspects, the feed gas is a low pressure, low quality natural gas with a composition of about 0.1 to 1% $CO_2$, 20 to 60% $C_1$, 0.001 to 1% $H_2S$, 2 to 20% $H_2$, 2 to 10% $C_2$-$C_5$, 0.05 to 5% $C_6$-$C_7$, 0.01 to 0.5% $C_8$-$C_{9+}$, 0.001 to 1% mercaptans, organic disulfides, thiophenes, carbonyl sulfides and sulfur oxide contaminants, with the balance being inerts (e.g., $O_2$ and $N_2$). As used herein, the term "about" in conjunction with a numeral refers to a range of that numeral starting from 20% below the absolute of the numeral to 20% above the absolute of the numeral, inclusive. For example, the term "about 100° F." refers to a range of 80° F. to 120° F., and the term "about 100 psig" refers to a range of 80 psig to 120 psig.

With respect to the COS hydrolysis unit it is contemplated that all currently known COS hydrolysis unit are suitable for use herein, so long as such hydrolysis units will allow (catalytic) conversion of COS to H2S and CO2. Similarly, the absorber may be conventional and include trays, packing, and/or other contact devices. A person of ordinary skill in the art will readily be able to configure such absorber based on given operational parameters, including gas volume, solvent, and gas composition.

Especially preferred solvents for absorption of the mercaptans and H2S from the COS hydrolysis unit effluent include lean (sulfur depleted or hydrotreated) hydrocarbon liquids, and particularly a hydrotreated naphtha characterized by API gravity ranging from 45 to 95, and an RVP (Reid Vapor Pressure) of 2 to 11.0 psia. However, various alternative hydrotreated lean solvents are also deemed suitable so long as such lean solvents selectively absorb the mercaptans and organic sulfur contaminants. Alternative generally suitable hydrotreated solvents include those that absorb mercaptans with relatively high specificity (e.g., at least 2 times, and more typically at least 5 times, and most typically at least 10 times better absorption) for of mercaptans relative to non-sulfurous compounds, including oxygen, CO, and/or $CO_2$. Therefore, the absorber will typically form a clean desulfurized gas overhead product and a rich sulfur-species (e.g., H2S, mercaptans, and other organic sulfur compounds [e.g., thiophenes]) containing solvent.

While not critical to the operation, it is generally preferred that a distillation column is downstream and fluidly coupled to the absorber to receive the mercaptans sulfur enriched solvent. This distillation column is preferably operated under conditions effective to separate at least part of the lighter hydrocarbons (e.g., propane and lighter) as an overhead vapor that may then be recycled back to the absorber. Alternatively, the lighter hydrocarbons may also be used in another portion of the plant for further separation, as fuel, or stored/sold. The bottom product (LPG and heavier components plus contaminants) of this distillation column is then fed to a conventional catalytic conversion unit, which is configured to operate as an oxidative catalytic unit to form disulfides from the light mercaptans and other sulfur containing species. Such reaction is typically performed in the presence of oxygen and caustic (NaOH) under conditions well known in the art.

It should be especially noted that the so formed disulfides in such catalytic units are easily separated from the remaining hydrocarbons as the light mercaptans (typically, methyl and ethyl mercaptans) and some of the organic sulfur are converted to a disulfides oil, which can then be properly disposed of. Moreover, such process can also be used to treat numerous other and relatively common hydrocarbon feeds (e.g. heavy straight-run gasolines, visbroken and coker derived naphthas, kerosenes, and diesels) and may therefore be operated to also receive a sulfur species containing LPG stream. The light mercaptans sulfur free hydrocarbon liquid from the catalytic oxidation unit can then be processed in a downstream distillation column that is configured and operated to fractionate C5/C6 and lighter components to an overhead vapor (that may be combined with the treated gas from the absorber) from the remaining C6 and heavier mercaptans components. Most preferably, the C6 and heavier mercaptans components from the distillation column are reused (directly or after processing in a refinery unit) as the lean solvent in the absorber. Therefore, it should be appreciated that contemplated configurations can produce a treated gas with a total sulfur content typically less than about 20 ppmv, and more typically less than about 10 ppmv, while the bottom liquid of the distillation column may be used in a refinery for further processing into a salable sulfur free C6+ hydrocarbon liquid.

Thus, specific embodiments and applications of mercaptan removal from feed gases have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a definition or use of a term in a reference, which is incorporated by reference herein is inconsistent or contrary to the definition of that term provided herein, the definition of that term provided herein applies and the definition of that term in the reference does not apply.

What is claimed is:

1. A gas treatment plant comprising:
   a COS hydrolysis unit configured to hydrolyze COS in a mercaptan-containing feed gas to hydrogen sulfide to thereby form a treated feed gas comprising the hydrogen sulfide;
   an absorber fluidly coupled to the COS hydrolysis unit and configured to receive and contact the treated feed gas with a lean hydrocarbon fluid to thereby produce a mercaptans sulfur enriched hydrocarbon fluid and a desulfurized product gas; and
   a catalytic conversion unit fluidly coupled to the absorber and configured to receive the enriched fluid and to produce disulfides from the mercaptans.

2. The plant of claim 1 further comprising a first distillation column fluidly coupled between the absorber and the catalytic conversion unit and configured such that the first distillation column produces a first sulfur-depleted overhead product and a C2-depleted mercaptans enriched hydrocarbon fluid.

3. The plant of claim 2 further comprising a first recycle conduit configured to feed the first sulfur-depleted overhead product to the treated feed gas.

4. The plant of claim 1 further comprising a second distillation column downstream and fluidly coupled to the catalytic conversion unit, and configured such that the second distillation column produces a second sulfur-depleted overhead product and a C6+ and heavy mercaptans enriched bottom hydrocarbon fluid.

5. The plant of claim 4 comprising a second conduit configured to feed the second sulfur-depleted overhead product to the desulfurized product gas.

6. The plant of claim 3 further comprising a second distillation column fluidly coupled to the catalytic conversion unit and configured such that the second distillation column produces a second sulfur-depleted overhead product and a C6+ and heavy mercaptans sulfur enriched hydrocarbon fluid.

7. The plant of claim 6 further comprising a second conduit configured to feed the second sulfur-depleted overhead product to the desulfurized product gas.

8. The plant of claim 4 or claim 6 further comprising a hydrocarbon refining hydrotreating unit configured to receive and convert the heavy mercaptans and organic sulfur enriched hydrocarbon fluid to produce the lean hydrotreated hydrocarbon fluid, and a portion of which is recycled back to the absorber.

9. The plant of claim 1 further comprising a liquefied petroleum gas source fluidly coupled to the catalytic conversion unit.

10. The plant of claim 1 further comprising a fuel gas source fluidly coupled to the COS hydrolysis unit and configured to provide the mercaptan-containing feed gas.

11. A method of removing sulfur compounds from a feed gas, comprising:
    hydrolyzing COS in a sulfur and mercaptan-containing feed gas to hydrogen sulfide to thereby form a treated feed gas comprising the hydrogen sulfide;
    absorbing sulfur species from the treated feed gas using a lean hydrotreated sulfur free hydrocarbon fluid to thereby produce a mercaptans sulfur enriched fluid and a desulfurized product gas; and catalytically converting the light in mercaptans species in the rich hydrocarbon fluid to thereby form disulfides.

12. The method of claim 11 further comprising a step of subjecting the rich hydrocarbon fluid to a first distillation to thereby produce a first sulfur-depleted overhead product and a C2-depleted and mercaptans enriched hydrocarbon fluid.

13. The method of claim 12 further comprising a step of feeding the first sulfur-depleted overhead product to the treated feed gas.

14. The method of claim 11 further comprising a step of subjecting the product of the catalytic conversion to a second distillation to thereby produce a second sulfur-depleted overhead product and a mercaptans and sulfur enriched hydrocarbon fluid.

15. The method of claim 14 further comprising a step of feeding the second sulfur-depleted overhead product to the desulfurized product gas.

16. The method of claim 13 further comprising a step of subjecting the product of the catalytic conversion to a second distillation to thereby produce a second sulfur-depleted overhead product and a mercaptans contaminated-enriched hydrocarbon fluid.

17. The method of claim 16 further comprising a step of feeding the second sulfur-depleted overhead product to the desulfurized product gas.

18. The method of claim 14 or claim 16 wherein a hydrocarbon refining hydrotreating unit receives and processes the C6+ sulfur and heavy mercaptans-enriched hydrocarbon fluid to produce the sulfur free lean hydrocarbon fluid.

19. The method of claim 11 further comprising a step of feeding liquefied petroleum gas to the catalytic conversion unit.

20. The method of claim 11 wherein the mercaptan-containing feed gas is provided by a fuel gas source.

\* \* \* \* \*